(12) United States Patent
Liu (10) Patent No.: US 11,176,192 B2
(45) Date of Patent: Nov. 16, 2021

(54) METHOD AND APPARATUS FOR RECALLING IMAGE FILE, CONTROL METHOD AND APPARATUS FOR RECALLING IMAGE FILE, AND MOBILE TERMINAL

(71) Applicant: Beijing Dajia Internet Information Technology Co., Ltd., Beijing (CN)

(72) Inventor: Shuo Liu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/148,978

(22) Filed: Jan. 14, 2021

(65) Prior Publication Data

US 2021/0165820 A1 Jun. 3, 2021

Related U.S. Application Data

(63) Continuation of application No. PCT/CN2019/096883, filed on Jul. 19, 2019.

(30) Foreign Application Priority Data

Aug. 20, 2018 (CN) .......................... 201810950551.2

(51) Int. Cl.
*G06F 16/538* (2019.01)
*H04L 12/58* (2006.01)
(Continued)

(52) U.S. Cl.
CPC .......... *G06F 16/538* (2019.01); *H04L 51/043* (2013.01); *H04L 51/32* (2013.01); *H04L 67/26* (2013.01); *H04M 1/72439* (2021.01)

(58) Field of Classification Search
CPC ....... G06F 16/538; H04L 67/26; H04L 51/32; H04L 51/043; H04M 1/72439
See application file for complete search history.

(56) References Cited

U.S. PATENT DOCUMENTS

| 2016/0182434 | A1 | 6/2016 | Systrom et al. |
| 2017/0034112 | A1* | 2/2017 | Perlegos ................. H04L 67/22 |

(Continued)

FOREIGN PATENT DOCUMENTS

| CN | 102045267 A | 5/2011 |
| CN | 104518953 A | 4/2015 |

(Continued)

OTHER PUBLICATIONS

International Search Report for International Application No. PCT/CN2019/096883 dated Oct. 9, 2019.

(Continued)

*Primary Examiner* — John B Walsh
(74) *Attorney, Agent, or Firm* — Meunier Carlin & Curfman LLC (57) ABSTRACT

Disclosed are a method and apparatus for recalling an image file, a control method and apparatus for recalling an image file, and a mobile terminal. The method for recalling an image file includes the following steps: receiving a notification message sent from a server for prompting that a target image file is recalled; determining whether the target image file is open according to the notification message; and if it is determined that the target image file is open, obtaining a replacement image file and displaying the replacement image file on the target image file layer.

15 Claims, 4 Drawing Sheets

(51) Int. Cl.
  *H04L 29/08*   (2006.01)
  *H04M 1/72439*   (2021.01)

(56) References Cited

U.S. PATENT DOCUMENTS

2017/0149700 A1    5/2017  Liu et al.
2018/0018707 A1*   1/2018  Berry, Jr. .............. H04L 51/046
2019/0379622 A1*  12/2019  Iyer ........................ H04L 51/22

FOREIGN PATENT DOCUMENTS

| CN | 105871684 A | 8/2016  |
| CN | 106330687 A | 1/2017  |
| CN | 106598926 A | 4/2017  |
| CN | 107786420 A | 3/2018  |
| CN | 108989191 A | 12/2018 |

OTHER PUBLICATIONS

How to get pictures like this on WeChat withdrawal, https://zhidao.baidu.com/question/1863125911431528467.
BuBull, "Retrieve Recalled Wechat Images and Find the Lost Youth", BuBull, post.smzdm.com/p/511223/, Nov. 28, 2016.
WeChat Mini Program Development—Setting Default Images, Error Loading Images, Xiaoyaoyuntian, www.bbsmax.com/A/E35pA6vLdv/, Mar. 8, 2018.
Second Office Action issued in Chinese Application No. 201810950551.2 dated Jul. 6, 2020.
Decision to Grant issued in Chinese Application No. 201810950551.2 dated Aug. 26, 2020.

\* cited by examiner

METHOD AND APPARATUS FOR RECALLING IMAGE FILE, CONTROL METHOD AND APPARATUS FOR RECALLING IMAGE FILE, AND MOBILE TERMINAL

CROSS REFERENCE TO RELATED APPLICATIONS

The present disclosure is a continuation of International Application No PCT/CN2019/096883, filed on Jul. 19, 2019, which claims priority of the Chinese Patent Application No. 201810950551.2, filed to the China National Intellectual Property Administration on Aug. 20, 2018 and entitled "METHOD AND APPARATUS FOR RECALLING IMAGE FILE, CONTROL METHOD AND APPARATUS FOR RECALLING IMAGE FILE, AND MOBILE TERMINAL", the entire contents of which are incorporated herein by reference.

FIELD

The disclosure relates to the technical field of communication, particularly to a method and an apparatus for recalling an image file, a control method and apparatus for recalling an image file, and a mobile terminal.

BACKGROUND

Instant messaging (IM) is a real-time communication service by which a user may establish a certain private chartroom on a network. At present, popular IM software on the internet includes Tencent QQ, WeChat, easyMarkets, DingTalk, BaiduHi, Fetion, Ali™, Jingdong Dongdong, Feivu, yy, Skype, Google Talk, icq, FastMsg, parox and the like.

At present, a group chat function has been provided for almost all IM, and people may send various texts, emoji and images to a group. An inventor has recognized that the current images and texts are equally supported to be recalled, and recall means that contents sent by a user may be recalled and may be terminated even if the contents are being viewed by the other party. After a user A sends an image to a user B, the user B opens the image to be viewed in a full screen, at the moment, the user A recalls the image, the image being viewed by the user B at the moment is recalled so as to be stopped from being displayed, and the user B receives a notification that the user has performed recalling.

SUMMARY

According to a first aspect of an embodiment of the present disclosure, the present disclosure provides a method for recalling an image file, including following steps:
  receiving, by a receiver, a notification message sent from a server, wherein the notification message is used for prompting that a target image file is recalled;
  determining, by the receiver, whether the target image file is open based on the notification message; and
  acquiring, by the receiver, a replacement image file and displaying the replacement image file on a target image file layer in response to that the target image file is open;
  wherein the acquiring the replacement image file includes:
  extracting, by the receiver, the replacement image file carried in the notification message or acquiring, by the receiver, a replacement image file from local.

According to a second aspect of an embodiment of the present disclosure, the present disclosure provides a control method for recalling an image file, including following steps:
  receiving, by a server, a recalling request for a target image file submitted by a sender; and
  sending, by a server, a notification message to a receiver so as to ensure that the receiver acquires a replacement image file and displays the replacement image file on a target image file layer in response to that the target image file is open; wherein the notification message is used for prompting that the target image file is recalled;
  wherein the replacement image file is carried in the notification message, or the replacement image file is acquired from local.

According to a third aspect of an embodiment of the present disclosure, the present disclosure provides a mobile terminal, including:
  a processor; and
  a memory configured to store an instruction executable for the processor:
  wherein the processor is configured to read the instruction to perform followings:
  receiving a notification message sent from a server, wherein the notification message is used for prompting that a target image file is recalled;
  determining whether the target image file is open based on the notification message; and
  acquiring a replacement image file and displaying the replacement image file on a target image file layer in response to that the target image file is open;
  wherein the acquiring the replacement image file includes:
  extracting, by the receiver, the replacement image file carried in the notification message or acquiring, by the receiver, a replacement image file from local.

According to a fourth aspect of an embodiment of the present disclosure, the present disclosure provides a non-transitory computer-readable storage medium, wherein an instrument in the storage medium is executed by a processor of a mobile terminal to cause the mobile terminal implement the method for recalling an image file according to according to the first aspect.

According to a fifth aspect of an embodiment of the present disclosure, the present disclosure provides a server, including:
  a processor; and
  a memory configured to store an instruction executable for the processor:
  wherein the processor is configured to read the instruction to implement the method for recalling the image file according to the second aspect.

According to a sixth aspect of an embodiment of the present disclosure, the present disclosure provides a non-transitory computer-readable storage medium, wherein an instrument in the storage medium is executed by a processor of a server to cause the server implement the control method for recalling an image file according to the second aspect.

BRIEF DESCRIPTION OF THE DRAWINGS

The above-mentioned and/or additional aspects of the present disclosure will become apparent and be easy to understand from the following description of embodiments in conjunction with accompanying drawings.

FIG. 1 illustrates a flow diagram of a method for recalling an image file according to an exemplary embodiment of the disclosure.

DETAILED DESCRIPTION OF THE EMBODIMENTS

Figure 1:
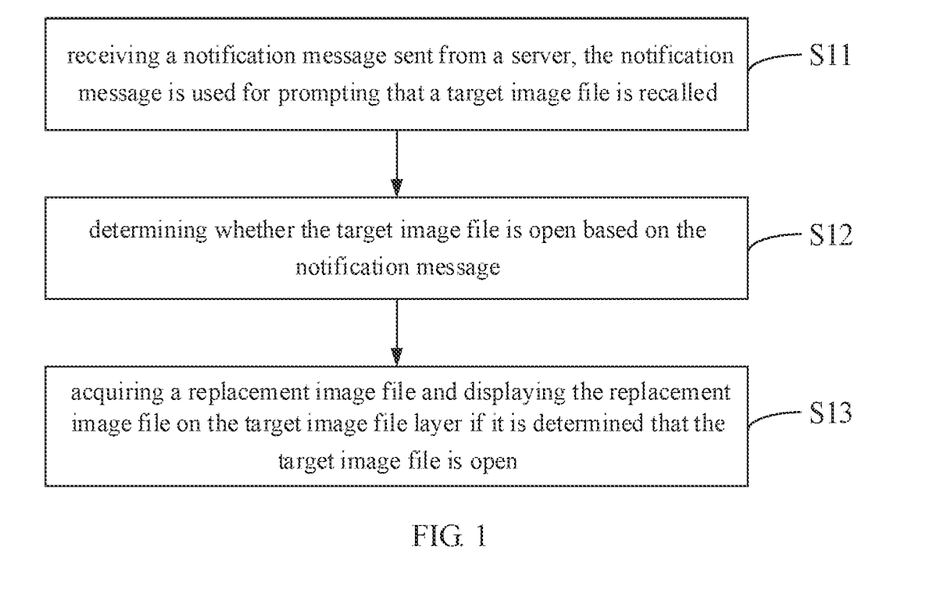

FIG. 1 is a flow diagram of a method for recalling an image file according to an exemplary embodiment. As shown in FIG. 1, the method for recalling the image file is applied to a mobile terminal and includes the following steps.

In S11, receiving a notification message sent from a server for prompting that a target image file is recalled.

In some embodiments, a sender initiates a request for sending an image carrying the target image file to the server, and the server sends the target image file to a receiver after receiving the target image file. The sender initiates a recalling request for the target image file to the server within an allowable time range during which the recalling is allowed, and the server sends the notification message for prompting that the target image file is recalled to the receiver after receiving the recalling request and recalls the target image file. Further, in some embodiments, the target image file includes, but is not limited to an image, a video, a song and an animoji.

In S12, determining whether the target image file is open based on the notification message.

A main purpose of the present disclosure is to solve the problem of unsmooth display brought by sudden recall of the target image file when the target image file received by a user as the receiver is displayed in a full screen. Therefore, in some embodiments, after the receiver receives the notification message, it is necessary to determine whether the target image file is open, and if it is determined that the target image file is open, a subsequent replacement operation is executed.

In some embodiments, it is assumed that a user B sends an image to a user A. After receiving the image, the user A selects to click on the image, at the moment, the image is displayed in a full screen. The user B may select to recall the sending of the image within the allowable time range during which the recalling is allowed, a system automatically sends a push notification to a mobile phone of user A to prompt that the image needs to be recalled, and meanwhile, a replacement image is carried to mark that the viewing of the current image is blocked. At the moment, the mobile phone of the user A may determine whether the user A has opened the received image and displayed the image in the full screen, if so, the received replacement image is automatically used as a new layer to be displayed on the current image, at the moment, an original image may not be viewed. When the user A clicks on the image to return to a chat dialog box, the system has replaced the image of the user B with a default replacement image. The user A may normally see the message sent by the user B, so that it is ensured that the display experience of the user A is smooth and is not affected.

In S13, if it is determined that the target image file is open, acquiring a preset replacement image file, and displaying the replacement image file on a target image file layer.

In some embodiments, there is one or more replacement image files. Each of the replacement image files may include various elements which include, but are not limited to an animation, an image, an avatar, an emoji and text information. The replacement image file may be any single element as above or a combination of a plurality of the elements, wherein the text information is configured to express any one or more of the following contents:

a file type, such as a text or an image, of the recalled target image file, a prompt that the display of the current target image file is blocked and a reason why the display of the target image file is blocked.

In some embodiments, the preset replacement image file may be stored in a server or stored in the receiver. If the replacement image file is located in the receiver, a local replacement image file is only required to be obtained for replacement during replacement. If the replacement image file is located in the server, the replacement image file carried in the notification message is extracted firstly, and then, the replacement image file is displayed on the target image file layer.

In some embodiments, the replacement image file may be preconfigured and stored in the server, may be modified or may be prestored in the receiver. In addition, the replacement image file may be automatically replaced and may be flexibly customized and is generally an image with rich pictures and characters customized by the server, including various rich contents such as an animation, an image, an emoji, a video, an avatar and text information. Moreover, the replacement image file carries information for prompting that the display of a currently browsed image file is blocked, so that a user may know that the original image is no longer available, but it doesn't seem abrupt. Optionally, the recalled image or text may be further marked in the replacement image file, and thus, the user experience is improved.

Further, the replacement image file may be one or more image files preconfigured in the server, and one or more of the configured image files may be modified. If there are a plurality of the replacement image files, priorities or a replacement order of the replacement image files may be set. If image files are required to be replaced, it is possible that corresponding image files are obtained according to the preset the priorities so as to be replaced or the replacement image files are sequentially obtained according to the preset replacement order so as to be replaced; or it is possible that the priorities of the plurality of replacement image files are set or modified, and therefore, if the replacement image files are subsequently sent to the receiver by the server and are replaced, the replacement image file with the higher priority may be sent according to the priorities.

In some embodiments, if the replacement image files are locally stored, a setting request for a replacement order of the plurality of the replacement image files is received, and the replacement order is set for all the replacement image files, so that the corresponding replacement image files are sequentially obtained for replacement display according to the preset replacement order during subsequent replacement, and automatic replacement is realized. For example, a replacement order of three images A, B and C is preset as A-B-C, if a current replacement image is A, software in the present disclosure records an identifier of the current replacement image, and if the image file is required to be replaced next time, a current replacement image file is determined according to the recorded identifier of the last replacement image file, and so on. According to the present disclosure, it is ensured that several continuous replacement image files are inconsistent due to the adoption of such a replacement mechanism, so that freshness is brought for the users, user experience is improved, and the phenomenon that the same replacement image is adopted every time to result in boredom from the users is avoided.

According to the present disclosure, if the sender has recalled the sent target image file, the recalled target image file may be replaced with the preset replacement image file, so that it is ensured that the display experience of the user of the receiver is smooth, the problem of unsmooth browsing experience of the user due to sudden recall of an image file when the user browses the image file is solved, and the user experience is improved.

Figure 2:
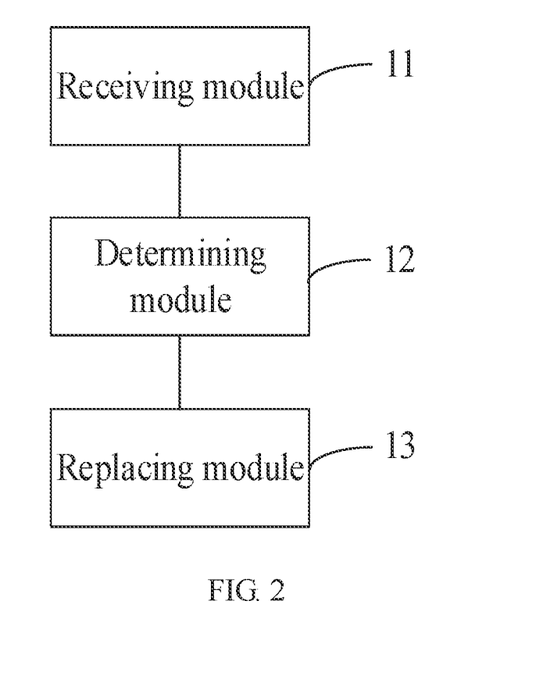
FIG. 2 illustrates a schematic diagram of an apparatus for recalling an image file according to an exemplary embodiment of the disclosure.

FIG. 2 is a schematic diagram of an apparatus for recalling an image file according to an exemplary embodiment. Referring to FIG. 2, the apparatus includes a receiving module 11, a determining module 12 and a replacing module 13.

The receiving module 11 is configured to receive a notification message sent from a server for prompting that a target image file is recalled.

In some embodiments, a sender initiates a request for sending an image carrying the target image file to the server, and the server sends the target image file to a receiver after receiving the target image file. The sender initiates a recalling request for the target image file to the server within an allowable time range during which the recalling is allowed, and the server sends the notification message for prompting that the target image file is recalled to the receiver after receiving the recalling request and recalls the target image file.

Further, in some embodiments, the target image file includes, but is not limited to an image, a video, a song and an animoji.

The determining module 12 is configured to determine whether the target image file is open based on the notification message.

A main purpose of the present disclosure is to solve the problem of unsmooth display brought by sudden recall of the target image file when the target image file received by a user as the receiver is displayed in a full screen. Therefore, in some embodiments, after the receiver receives the notification message, it is necessary to determine whether the target image file is open, and if it is determined that the target image file is open, a subsequent replacement operation is executed.

In some embodiments, it is assumed that a user B sends an image to a user A. After receiving the image, the user A selects to click on the image, at the moment, the image is displayed in a full screen. The user B may select to recall the sending of the image within the allowable time range, a system automatically sends a push notification to a mobile phone of the user A to prompt that the image needs to be recalled, and meanwhile, a replacement image is carried to mark that the viewing of the current image is blocked. At the moment, the mobile phone of the user A may determine whether the user A has opened the received image and displayed the image in the full screen, if so, the received replacement image is automatically used as a new layer to be displayed on the current image, at the moment, an original image may not be viewed. When the user A clicks on the image to return to a chat dialog box, the system has replaced the image of the user B with a default replacement image. The user A may normally see the message sent by the user B, so that it is ensured that the display experience of the user A is smooth and is not affected.

The replacing module 13 is configured to, if it is determined that the target image file is open, acquire a preset replacement image file and display the replacement image file on a target image file layer.

In some embodiments, there is one or more replacement image files. Each of the replacement image files may include various elements which include, but are not limited to an animation, an image, an avatar, an emoji and text information. The replacement image file may be any single element as above or a combination of a plurality of the elements, wherein the text information is configured to express any one or more of the following contents:

a file type, such as a text or an image, of the recalled target image file, a prompt that the display of the current target image file is blocked and a reason why the display of the target image file is blocked.

In some embodiments, the preset replacement image file may be stored in a server or stored in the receiver. If the replacement image file is located in the receiver, a local replacement image file is only required to be obtained for replacement during replacement. If the replacement image file is located in the server, the replacement image file carried in the notification message is extracted firstly, and then, the replacement image file is displayed on the target image file layer.

In some embodiments, the replacement image file may be preconfigured and stored in the server. Optionally, the replacement image file may be flexibly customized and is generally an image with rich pictures and characters customized by the server, including various rich contents such as an animation, an emoji, a video, and so on. Moreover, the replacement image file may carry text information by which a user may know that the original image is no longer available, but it doesn't seem abrupt, and thus, the user experience is improved.

Further, the replacement image file may be one or more image files preconfigured in the server, and one or more of the configured image files may be modified; or it is possible that the priorities of the plurality of replacement image files are set or modified, and therefore, if the replacement image files are subsequently sent to the receiver by the server and are replaced, the replacement image file with the higher priority may be sent according to the priorities.

In some embodiments, if the replacement image files are locally stored, a setting request for a replacement order of the plurality of the replacement image files is received, and the replacement order is set for all the replacement image files, so that the corresponding replacement image files are sequentially obtained for replacement display based on the preset replacement order during subsequent replacement, and automatic replacement is realized. For example, a replacement order of three images A, B and C is preset as A-B-C, if a current replacement image is A, software in the present disclosure records an identifier of the current replacement image, and if the image file is required to be replaced next time, a current replacement image file is determined according to the recorded identifier of the last replacement image file, and so on. According to the present disclosure, it is ensured that several continuous replacement image files are inconsistent due to the adoption of such a replacement mechanism, so that freshness is brought for the users, the user experience is improved, and the phenomenon that the same replacement image is adopted every time to result in boredom from the users is avoided.

Figure 3:
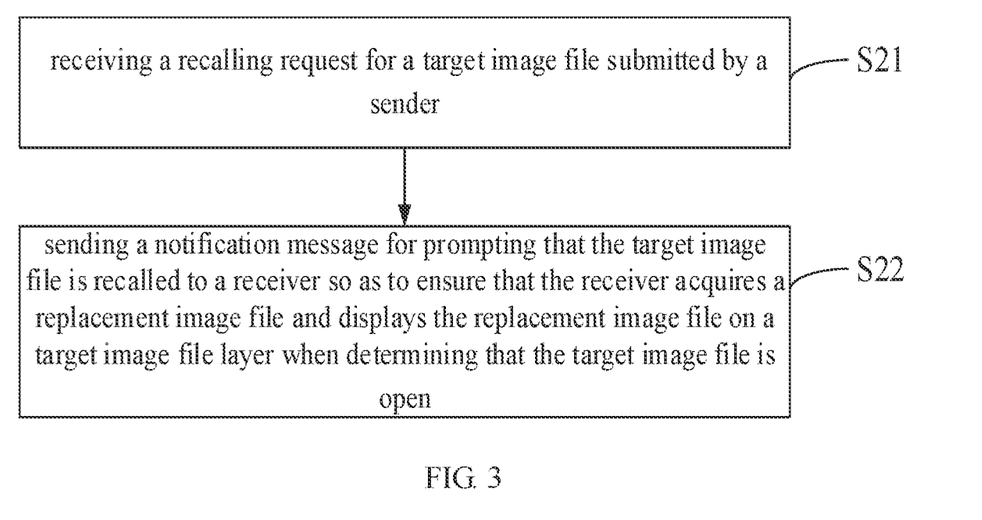
FIG. 3 illustrates a flow diagram of a control method for recalling an image file according to an exemplary embodiment of the disclosure.

FIG. 3 is a flow diagram of a control method for recalling an image file according to an exemplary embodiment. As shown in FIG. 3, the control method for recalling the image file is applied to a mobile terminal and includes the following steps.

In S21, receiving a recalling request for a target image file submitted by a sender.

The sender initiates a request for sending an image carrying the target image file to a server, and the server sends the target image file to a receiver after receiving the target image file. The sender initiates a recalling request for the target image file to the server within an allowable time range during which the recalling is allowed, and the server sends a notification message for prompting that the target image file is recalled to the receiver after receiving the recalling request and recalls the target image file.

Further, in some embodiments, the target image file includes, but is not limited to an image, a video, a song and an animoji.

In S22, sending a notification message for prompting that the target image file is recalled to a receiver so as to ensure that the receiver obtains a preset replacement image file and displays the replacement image file on a target image file layer when determining that the target image file is open.

A main purpose of the present disclosure is to solve the problem of unsmooth display brought by sudden recall of the target image file when the target image file received by a user as the receiver is displayed in a full screen. Therefore, in some embodiments, after the receiver receives the notification message, it is necessary to determine whether the target image file is open, and if it is determined that the target image file is open, a subsequent replacement operation is executed.

In some embodiments, two following methods for sending the notification message for prompting that the target image file is recalled to the receiver may be adopted in the present disclosure so as to ensure that the receiver obtains a preset replacement image file and displays the replacement image file on a target image file layer when determining that the target image file is open.

Firstly, the server sends the replacement image file carried in the notification message to the receiver; after the receiver receives the notification message, it is determined whether the target image file is open; and if the receiver determines that the target image file is open, the replacement image file carried in the notification message is extracted, and the replacement image file as a new layer is displayed on an upper layer of the target image file.

Secondly, after the receiver receives the notification message, it is determined whether the target image file is open; and if the receiver determines that the target image file is open, a local replacement image file is obtained from local, and the replacement image file as a new layer is displayed on an upper layer of the target image file.

In some embodiments, the replacement image file may be stored in the local receiver, or the replacement image file is preconfigured and stored in the server. Optionally, the replacement image file may be flexibly customized and is generally an image with rich pictures and characters customized by the server, including various rich contents such as an animation, an emoji and a video. Moreover, the replacement image file may carry text information by which a user may know that the original image is no longer available, but it doesn't seem abrupt, and thus, the user experience is improved.

Further, the replacement image file may be one or more image files preconfigured in the server, and one or more of the configured image files may be modified; or it is possible that the priorities of the plurality of replacement image files are set or modified, and therefore, if the replacement image files are subsequently sent to the receiver by the server and are replaced, the replacement image file with the higher priority may be sent based on the priorities.

Further, it is possible that a replacement order of the plurality of the replacement image files is set or modified, therefore, if the recalling request is received, the corresponding replacement image files are sequentially sent to the receiver based on the replacement order, and thus, automatic replacement is realized. For example, a replacement order of three images A, B and C is preset as A-B-C, if a current replacement image is A, software in the present disclosure records an identifier of the current replacement image, and if the image file is required to be replaced next time, a current replacement image file is determined based on the recorded identifier of the last replacement image file, and so on. According to the present disclosure, it is ensured that several continuous replacement image files are inconsistent due to the adoption of such a replacement mechanism, so that freshness is brought for the users, the user experience is improved, and the phenomenon that the same replacement image is adopted every time to result in boredom from the users is avoided.

Further, according to the present disclosure, a modification request for the replacement image file is received, a new image file carried in the modification request is extracted, and the corresponding replacement image file is modified to form the new image file.

Figure 4:
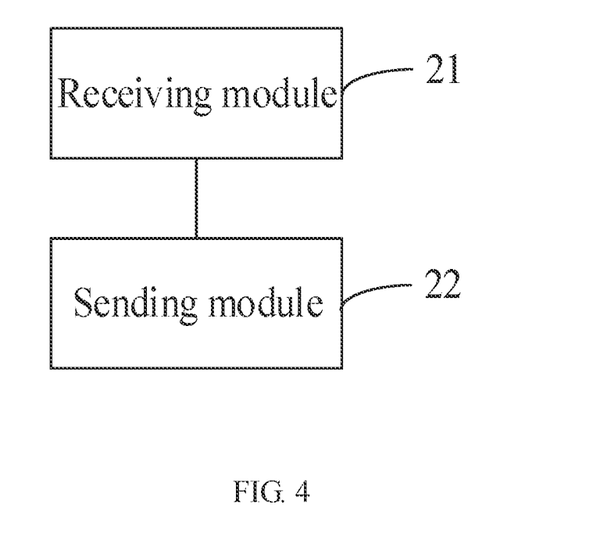
FIG. 4 illustrates a schematic diagram of a control apparatus for recalling an image file according to an exemplary embodiment of the disclosure.

FIG. 4 is a schematic diagram of a control apparatus for recalling an image file according to an exemplary embodiment. Referring to FIG. 4, the apparatus includes a receiving module 21 and a sending module 22.

The receiving module 21 is configured to receive a recalling request for a target image file submitted by a sender.

The sender initiates a request for sending an image carrying the target image file to a server, and the server sends the target image file to a receiver after receiving the target image file. The sender initiates a recalling request for the target image file to the server within an allowable time range during which the recalling is allowed, and the server sends a notification message for prompting that the target image file is recalled to the receiver after receiving the recalling request and recalls the target image file.

Further, in some embodiments, the target image file includes, but is not limited to an image, a video, a song and an animoji.

The sending module 22 is configured to send a notification message for prompting that the target image file is recalled to a receiver so as to ensure that the receiver obtains a preset replacement image file and displays the replacement image file on a target image file layer when determining that the target image file is open.

A main purpose of the present disclosure is to solve the problem of unsmooth display brought by sudden recall of the target image file when the target image file received by a user of the receiver is displayed in a full screen. Therefore, in some embodiments, after the receiver receives the notification message, it is necessary to determine whether the target image file is open, and if it is determined that the target image file is open, a subsequent replacement operation is executed.

In some embodiments, two following methods for sending the notification message for prompting that the target image file is recalled to the receiver are preferably adopted in the present disclosure so as to ensure that the receiver obtains a preset replacement image file and displays the replacement image file on a target image file layer when determining that the target image file is open.

Firstly, the server sends the replacement image file carried in the notification message to the receiver; after the receiver receives the notification message, it is determined whether the target image file is open; and if the receiver determines that the target image file is open, the replacement image file carried in the notification message is extracted, and the replacement image file as a new layer is displayed on an upper layer of the target image file.

Secondly, after the receiver receives the notification message, it is determined whether the target image file is open; and if the receiver determines that the target image file is open, a local replacement image file is obtained from local, and the replacement image file as a new layer is displayed on an upper layer of the target image file.

In some embodiments, the replacement image file may be stored in the local receiver, or the replacement image file is preconfigured and stored in the server. Optionally, the replacement image file may be flexibly customized and is generally an image with rich pictures and characters customized by the server, including various rich contents such as an animation, an emoji and a video. Moreover, the replacement image file may carry text information by which a user may know that the original image is no longer available, but it doesn't seem abrupt, and thus, the user experience is improved.

Further, the replacement image file may be one or more image files preconfigured in the server, and one or more of the configured image files may be modified; or it is possible that the priorities of the plurality of replacement image files are set or modified, and therefore, if the replacement image files are subsequently sent to the receiver by the server and are replaced, the replacement image file with the higher priority may be sent according to the priorities.

Further, it is possible that a replacement order of the plurality of the replacement image files is set or modified, therefore, if the recalling request is received, the corresponding replacement image files are sequentially sent to the receiver based on the replacement order, and thus, automatic replacement is realized. For example, a replacement order of three images A, B and C is preset as A-B-C, if a current replacement image is A, software in the present disclosure records an identifier of the current replacement image, and if the image file is required to be replaced next time, a current replacement image file is determined based on the recorded identifier of the last replacement image file, and so on. According to the present disclosure, it is ensured that several continuous replacement image files are inconsistent due to the adoption of such a replacement mechanism, so that freshness is brought for the users, the user experience is improved, and the phenomenon that the same replacement image is adopted every time to result in boredom from the users is avoided.

Further, according to the present disclosure, a modification request for the replacement image file is received, a new image file carried in the modification request is extracted, and the corresponding replacement image file is modified to form the new image file.

Figure 5:
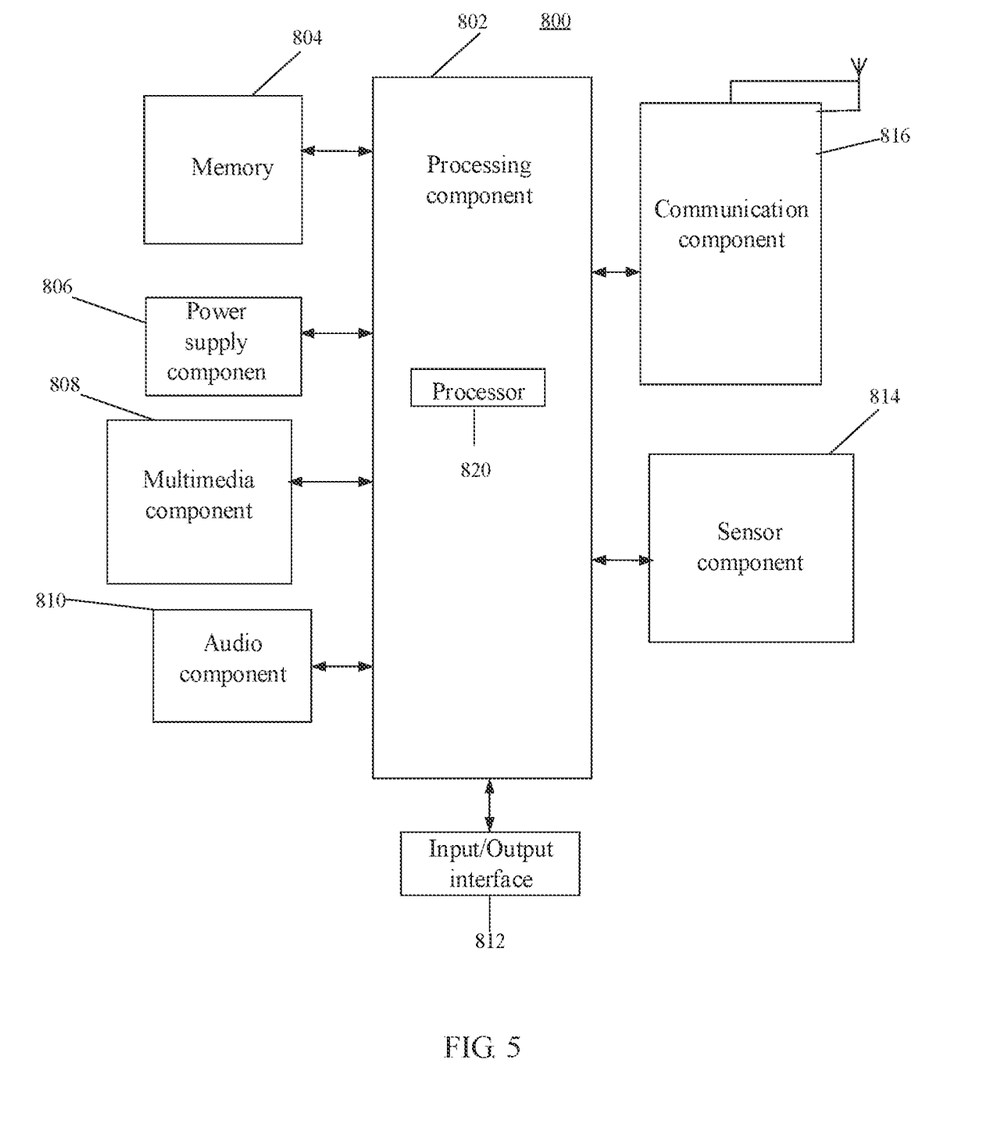
FIG. 5 illustrates a block diagram of an apparatus according to an exemplary embodiment of the disclosure.

FIG. 5 is a block diagram of an apparatus 800 for recalling an image file according to an exemplary embodiment. For example, the apparatus 800 may be a mobile phone, a computer, a digital broadcasting terminal, a message receiving/sending device, a game console, a tablet device, a medical device, a fitness device, a personal digital assistant and the like.

Referring to FIG. 5, the apparatus 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls the overall operation of the apparatus 800, such as operations associated with display, telephone calling, data communication, camera operation and recording operation. The processing component 802 may include one or more processors 820 to execute an instruction so as to complete all or parts of steps of the above-mentioned method. In addition, the processing component 802 may include one or more modules facilitating the interaction between the processing component 802 and each of other components. For example, the processing component 802 may include a multimedia module so as to facilitate the interaction between the multimedia component 808 and the processing component 802.

The memory 804 is configured to store various types of data so as to support the operations on the apparatus 800. An example of the data includes an instruction for operating any disclosure programs or methods on the apparatus 800, contact data, telephone directory data, messages, images, videos and the like. The memory 804 may be achieved by any types of volatile or non-volatile storage devices or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disc.

The power supply component 806 provides power for various components of the apparatus 800. The power supply component 806 may include a power supply management system, one or more power sources and other components associated with the generation, management and power distribution of the apparatus 800.

The multimedia component 808 includes a screen located between the apparatus 800 and a user and provided with an output interface. In some embodiments, the screen may include a liquid crystal display (LCD) and a touch panel (TP). If the screen includes the TP, the screen may be achieved as a touch screen so as to receive an input signal from a user. The TP includes one or more touch sensors so as to sense touch, slip and gestures on the TP. The touch sensor not only may sense a boundary of a touch or slip action, but also may detect duration time and pressure related to the touch or slip operation. In some embodiments, the multimedia component 808 includes a front camera and/or a rear camera. When the apparatus 800 is in an operating mode such as a shooting mode or a video mode, the front camera and/or a rear camera may receive external multimedia data. Each of the front camera and the rear camera may be a fixed optical lens system or may have focal length and optical zooming capability.

The audio component 810 is configured to output and/or input an audio signal. For example, the audio component 810 includes a microphone (MIC), when the apparatus 800 is in an operating mode such as a calling mode, a recording mode and a voice recognition mode, the MIC is configured to receive an external audio signal. The received audio signal may be further stored in the memory 804 and may be sent by the communication component 816. In some embodiments, the audio component 810 further includes a loudspeaker for outputting an audio signal.

The I/O interface 812 is provided between the processing component 802 and a peripheral interface module, and the above-mentioned peripheral interface module may be a keyboard, a click wheel, buttons and the like. These buttons may include, but are not limited to a homepage button, a volume button, a start button and a lock button.

The sensor component 814 includes one or more sensors for providing state evaluation on various aspects for the apparatus 800. For example, the sensor component 814 may detect a starting/stopping state of the apparatus 800 and the relative positioning of the components, for example, the component is used as a display and a keypad of the apparatus 800, and the sensor component 814 may also detect the position change of the apparatus 800 or one component of the apparatus 800, the existence or inexistence of contact between a user and the apparatus 800, the orientation or acceleration/deceleration of the apparatus 800 and the temperature variation of the apparatus 800. The sensor component 814 may include a proximity sensor configured to detect the existence of a nearby object when no any physical contacts exist. The sensor component 814 may further include an optical sensor such as a CMOS or CCD image sensor used in imaging disclosures. In some embodiments, the sensor component 814 may further include an acceleration sensor, a gyroscope sensor, a magnetic sensor, a pressure sensor or a temperature sensor.

The communication component 816 is configured to facilitate the communication between the apparatus 800 and any one of other devices in a wired or wireless way. The apparatus 800 may be accessed to a wireless network based on a communication standard, such as a WiFi, an operator network (such as 2G, 3G, 4G, or 5G) or a combination thereof. In an exemplary embodiment, the communication component 816 receives a broadcast signal or broadcast related information from an external broadcast management system through a broadcast channel. In one exemplary embodiment, the communication component 816 further includes a near-field communication (NFC) module so as to facilitate short-range communication. For example, the NFC module may be achieved based on a radio frequency identification (RFID) technology, an infrared data association (IrDA) technology, an ultrawide band (UWB) technology, a Bluetooth (BT) technology and other technologies.

In an exemplary embodiment, the apparatus 800 may be achieved by one or more of an disclosure specific integrated circuit (ASIC), a digital signal processor (DSP), a digital signal processing device (DSPD), a programmable logic device (PLD), a field-programmable gate array (FPGA), a controller, a microcontroller, a microprocessor or other electronic elements and is used for executing the above-mentioned method.

In an exemplary embodiment, further provided is a non-transitory computer-readable storage medium including an instruction, such as a memory 804 including an instruction, the above-mentioned instruction may be executed by the processor 820 of the apparatus 800 so as to complete the above-mentioned method. For example, the non-transitory computer-readable storage medium may be an ROM, a random access memory (RAM), a CD-ROM, a magnetic tape, a floppy disk, an optical data storage device and the like.

Figure 6:
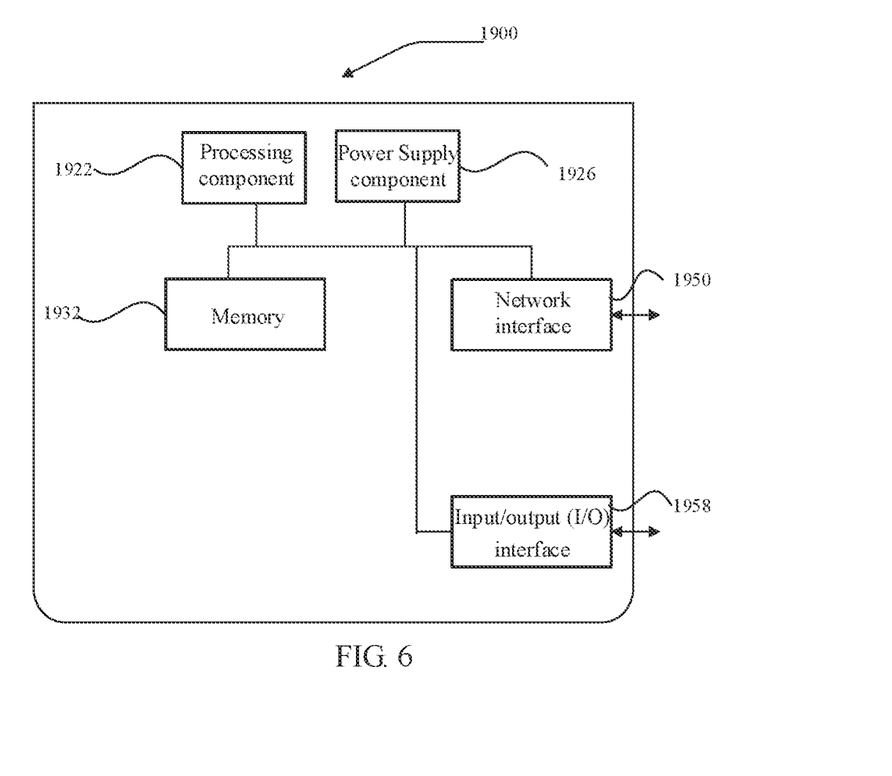
FIG. 6 illustrates a block diagram of an apparatus according to an exemplary embodiment of the disclosure.

FIG. 6 is a block diagram of a control apparatus 1900 for recalling an image file according to an exemplary embodiment. For example, the control apparatus 1900 may be provided with a server. Referring to FIG. 6, the apparatus 1900 includes a processing component 1922 further including one or more processors and a memory resource represented by a memory 1932 for storing an instruction, such as a disclosure program, which may be executed by the processing component 1922. The disclosure program stored in the memory 1932 may include one or more modules with each corresponding to one group of instruction. In addition, the processing component 1922 is configured to execute the instruction so as to execute the above-mentioned control method for recalling the image file.

The apparatus 1900 may further include a power supply component 1926 configured to execute power supply management of the apparatus 1900, a wired or wireless network interface 1950 configured to connect the apparatus 1900 to a network and an input/output (I/O) interface 1958. The apparatus 1900 may be operated on the basis of an operating system, such as Windows Server™, Mac OS X™, Unix™, Linux™, FreeBSD™ or the like stored in the memory 1932.

Those skilled in the art will readily envision other implementation solutions of the present disclosure after considering the specification and putting the present disclosure disclosed herein into practice. The present disclosure aims at covering any variations, purposes or adaptive changes of the present disclosure, and these variations, purposes or adaptive changes conform to a general principle of the present disclosure and include common general knowledge or conventional technical means in the undisclosed technical field of the present disclosure. The specification and the embodiments are merely regarded to be exemplary, and the true scope and spirit of the present disclosure are appointed by the following claims.

What is claimed is:

1. A method for recalling an image file, comprising:
    receiving, by a receiver, a notification message sent from a server, wherein the notification message is used for prompting that a target image file is recalled;
    determining, by the receiver, whether the target image file is open based on the notification message; and
    acquiring, by the receiver, a replacement image file and displaying the replacement image file on a target image file layer in response to that the target image file is open;
    wherein said acquiring the replacement image file comprises:
    extracting, by the receiver, the replacement image file carried in the notification message or acquiring, by the receiver, a replacement image file from local;
    wherein the method further comprises:
    receiving an order setting request in response to that the replacement image files are locally stored, wherein the order setting request is used for setting a replacement order of a plurality of the replacement image files; and
    setting the replacement order for the replacement image files.

2. The method according to claim 1, wherein the replacement image file is stored in local or is stored in a server, and the replacement image file comprises at least one file.

3. The method according to claim 1, further comprising:
    receiving, by the receiver, a priority setting request in response to that the replacement image files are locally stored, wherein the priority setting request is used for setting priorities of a plurality of the replacement image files; and setting replacement priorities for the replacement image files.

4. The method according to claim 3, wherein said acquiring the replacement image file comprises:
acquiring the replacement image file with a highest priority based on the replacement priorities, and displaying the replacement image file with the highest priority.

5. The method according to claim 1, wherein said acquiring the replacement image file and displaying the replacement image file on the target image file layer comprises:
sequentially acquiring the replacement image files based on the replacement order, and displaying the replacement image files on the target image file layer in response to that the target image file is open.

6. The method according to claim 1, wherein each of the replacement image files comprises at least one of:
an animation, an image, or text information.

7. The method according to claim 1, wherein the text information comprises at least one of:
a file type of recalled target image file, a prompt that a display of the current target image file is blocked or a reason why the display of the target image file is blocked.

8. The method according to claim 1, wherein the target image file comprises at least one of:
an image, a video, or a song.

9. A control method for recalling an image file, comprising:
receiving, by a server, a recalling request for a target image file submitted by a sender; and
sending, by the server, a notification message to a receiver so as to ensure that the receiver acquires a replacement image file and displays the replacement image file on a target image file layer in response to that the target image file is open; wherein the notification message is used for prompting that the target image file is recalled;
wherein the replacement image file is carried in the notification message, or the replacement image file is acquired from local;
wherein the method further comprises:
setting a replacement order of the replacement image files in response to that the replacement image file comprises a plurality of the replacement image files; and sequentially sending the replacement image files to the receiver based on the replacement order in response to that the recalling request is received.

10. The method according to claim 9, further comprising:
receiving, by the server, a modification request, extracting a new image file carried in the modification request, and modifying the replacement image file as the new image file.

11. The method according to claim 9, wherein the replacement image file comprises at least one replacement image file; and the method further comprises: setting replacement priorities for the replacement image file in response to that the image file comprises a plurality of replacement image files.

12. A mobile terminal, comprising:
a processor; and
a memory configured to store an instruction executable for the processor;
wherein the processor is configured to read the instruction to perform followings:
receiving a notification message sent from a server, wherein the notification message is used for prompting that a target image file is recalled;
determining whether the target image file is open based on the notification message; and
acquiring a replacement image file and displaying the replacement image file on a target image file layer in response to that the target image file is open;
wherein said acquiring the replacement image file comprises: extracting the replacement image file carried in the notification message or acquiring a replacement image file from local;
wherein the processor is further configured to read the instruction to perform followings:
receiving an order setting request in response to that the replacement image files are locally stored, wherein the order setting request is used for setting a replacement order of a plurality of the replacement image files; and setting the replacement order for the replacement image files.

13. A non-transitory computer-readable storage medium, wherein an instrument in the storage medium is executed by a processor of a mobile terminal to cause the mobile terminal to implement the method for recalling an image file according to claim 1.

14. The server, comprising:
a processor; and
a memory configured to store an instruction executable for the processor;
wherein the processor is configured to read the instruction to implement the control method for recalling an image file according to the claim 9.

15. A non-transitory computer-readable storage medium, wherein an instrument in the storage medium is executed by a processor of the server to cause the server to implement the control method for recalling an image file according to claim 9.

* * * * *